United States Patent
Best et al.

(10) Patent No.: US 7,106,697 B1
(45) Date of Patent: Sep. 12, 2006

(54) METHOD FOR DYNAMICALLY COMPUTING A SWITCHING SCHEDULE

(75) Inventors: Robert E. Best, Richardson, TX (US); Ramaswamy Chandrasekaran, Plano, TX (US); John R. Rudin, III, Dallas, TX (US); Rose Q. Hu, Plano, TX (US); Jeff L. Watson, Dallas, TX (US); Lakshman S. Tamil, Plano, TX (US); Alessandro Fabbri, Richardson, TX (US)

(73) Assignee: Lighthouse Capital Partners, IV, LP, Greenbrae, CA (US)

( * ) Notice: Subject to any disclaimer, the term of this patent is extended or adjusted under 35 U.S.C. 154(b) by 958 days.

(21) Appl. No.: 10/114,925

(22) Filed: Apr. 3, 2002

Related U.S. Application Data

(60) Provisional application No. 60/306,954, filed on Jul. 20, 2001.

(51) Int. Cl.
*H04J 3/14* (2006.01)
*H04L 12/54* (2006.01)

(52) U.S. Cl. .................. 370/231; 370/395.4; 370/413
(58) Field of Classification Search ................ 370/229, 370/385–396, 352, 380, 431, 232, 235; 379/219
See application file for complete search history.

(56) References Cited

U.S. PATENT DOCUMENTS

| | | | |
|---|---|---|---|
| 5,416,769 A | 5/1995 | Karol ........................ 370/60 |
| 5,469,284 A | 11/1995 | Haas ........................ 359/139 |
| 5,486,943 A | 1/1996 | Sasayama et al. .......... 359/123 |
| 5,734,486 A | 3/1998 | Guillemot et al. .......... 359/139 |
| 5,737,106 A | 4/1998 | Sansonetti et al. ......... 359/140 |
| 6,304,552 B1 * | 10/2001 | Chapman et al. .......... 370/232 |
| 6,345,040 B1 | 2/2002 | Stephens et al. |
| 6,665,495 B1 | 12/2003 | Miles et al. |
| 2002/0029238 A1 | 3/2002 | Okuhata |
| 2003/0067653 A1 | 4/2003 | Aicklen et al. |
| 2005/0276263 A1 * | 12/2005 | Suetsugu et al. ........... 370/389 |

OTHER PUBLICATIONS

Chi-Feng Wu et al, Simulation-based test algorithm generation and port scheduling for multi-port memories, Jun. 2001, AMC Press, Proceedings of the 38th conference on Design automation, pp. 301-306.*

Peter Mattson et al, Communication Scheduling, Nov. 2000, AMC Press, ACM SIGARCH Computer Architecture News , ACM SIGOPS Operating Systems Review , Proceedings of the ninth international conference on Architectural support for programming languages and operating systems ASPLOS-IX, vol. 28, 34 Issue 5 , 5, pp. 82-92.*

(Continued)

*Primary Examiner*—Alpus H. Hsu
*Assistant Examiner*—Prenell Jones
(74) *Attorney, Agent, or Firm*—Sprinkle IP Law Group

(57) ABSTRACT

Methods and systems for dynamically computing a schedule defining interconnections between ports in a switching system. In one embodiment, a switching core requests demand reports from the ingress ports. In response to this request, the ingress ports generate a series of suggested port schedules, beginning with a first choice, then a second choice, and so on. The schedules are transmitted to the switching core, beginning with the first choice. The switching core receives the first choice for each of the ports and determines whether the aggregate schedule defined by the first choices is valid. If the aggregate schedule is valid, then this schedule is implemented. If the aggregate schedule is not valid, portions of it are discarded and the next choice from each of the ports is examined to identify connections to replace the discarded portions. This process is repeated until a valid schedule is obtained.

24 Claims, 5 Drawing Sheets

OTHER PUBLICATIONS

G. Depovere, et. al., Philips Research Laboratories, "*A Flexible Cross-Connect Network Using Multiple Object Carriers,*" Date Unknown, All Pages.

John M. Senior, et al., SPIE—The International Society for Optical Engineering, "*All-Optical Networking 1999: Architecture, Control, and Management Issues*" vol. 3843, pp. 111-119, dated Sep. 19-21, 1999.

Jonathan S. Turner, Journal of High Speed Networks 8 (1999) 3-16 IOS Press, "*Terabit Burst Switching*", pp. 3-16.

Ken-ichi Sato, IEEE Journal on Selected Areas in Communications, vol. 12, No. 1, Jan. 1994 "*Network Performance and Integrity Enhancement with Optical Path Layer Technologies*", pp. 159-170.

F. Callegati, et al., Optical Fiber Technology 4, 1998 "*Architecture and Performance of a Broadcast and Select Photonic Switch\**", pp. 266-284.

Soeren Lykke Danielsen, et al., "*WDM Packet Switch Architectures and Analysis of the Influence of Tuneable Wavelength Converters on the Performance*".

Soeren L. Danielsen, et al., IEEE Photonics Technology Letters, vol. 10, No. 6, Jun. 1998 "*Optical Packet Switched Network Layer Without Optical Buffers*".

John M. Senior, et al., SPIE—The International Society of Optical Engineering, *All-Optical Networking: Architecture, Control and Management Issues* dated Nov. 3-5, 1998, vol. 3531, pp. 455-464.

M.C. Chia, et al., Part of SPIE Conference on All-Optical Networking: Architecture, Control and Management Issues, Nov. 1998, "*Performance of Feedback and Feedforward Arrayed—Waveguide Gratings-Based Optical Packet Switches with WDM Inputs/Outputs*".

\* cited by examiner

METHOD FOR DYNAMICALLY COMPUTING A SWITCHING SCHEDULE

RELATED APPLICATIONS

The present application claims priority to U.S. Provisional Patent Application Ser. No. 60/306,954 entitled "System and Method for Dynamic Scheduling Implementation to Eliminate Blocking and Optimizing Performance on an All-Optical Switch" filed on Jul. 20, 2001, which is incorporated by reference as if set forth herein in its entirety.

BACKGROUND

1. Field of the Invention

The invention relates generally to the switching of data and more particularly to the manner of dynamically computing a schedule defining a sequence of connections between a set of ingress ports and a set of egress ports.

2. Related Art

One of the problems that may be encountered in data switching is the blocking of data transfers because the data transfer path is already in use. In other words, while a first port is transferring data to a second port, the second port cannot receive data from any other source until control of the port is relinquished. This may significantly impact the latency of the data transfers.

This problem is typically addressed through the use of a non-blocking static data link. Conventionally, such data links operate by scheduling data transfers through the links based on statistical models of the data traffic which is expected to be transferred through the links. By planning for the expected traffic and scheduling transfers accordingly, these systems attempt to minimize blocking.

One of the disadvantages of these conventional systems is that they are based on static models of the data traffic. If the actual traffic varies from the anticipated scenario, the systems cannot adapt to the new behavior. While the statistical model upon which the scheduling of the data is based may be ideal for certain cases, it will likely be far from ideal in other cases. The performance of the systems may suffer as a result.

SUMMARY OF THE INVENTION

One or more of the problems outlined above may be solved by the various embodiments of the invention. Broadly speaking, the invention comprises a method and corresponding systems for dynamically computing a set of connections between a set of ingress ports and a set of egress ports. In one embodiment, a switching core requests demand reports from the ingress ports. In response to this request, the ingress ports generate a series of suggested port connections, beginning with a first choice, then a second choice, and so on. The port connections are transmitted to the switching core, beginning with the first choice. The switching core receives the first choice for each of the ports and determines whether the aggregate schedule defined by the first choices is valid. If the aggregate schedule is valid, then this schedule is implemented. If the aggregate schedule is not valid, portions of it are discarded and the next choice from each of the ports is examined to identify connections to replace the discarded portions. This process is repeated until a valid schedule is obtained.

Numerous alternative embodiments are also possible, and are believed to be within the scope of the appended claims.

The present method may provide a number of advantages over conventional scheduling methods. For example, since the scheduling of data transfers can be dynamically adapted to the changing character of the incoming data traffic, the system may experience lower latency and greater performance than other systems, which implement a single schedule and maintain that schedule, regardless of changes in data traffic.

BRIEF DESCRIPTION OF THE DRAWINGS

Other objects and advantages of the invention may become apparent upon reading the following detailed description and upon reference to the accompanying drawings.

Figure 1:
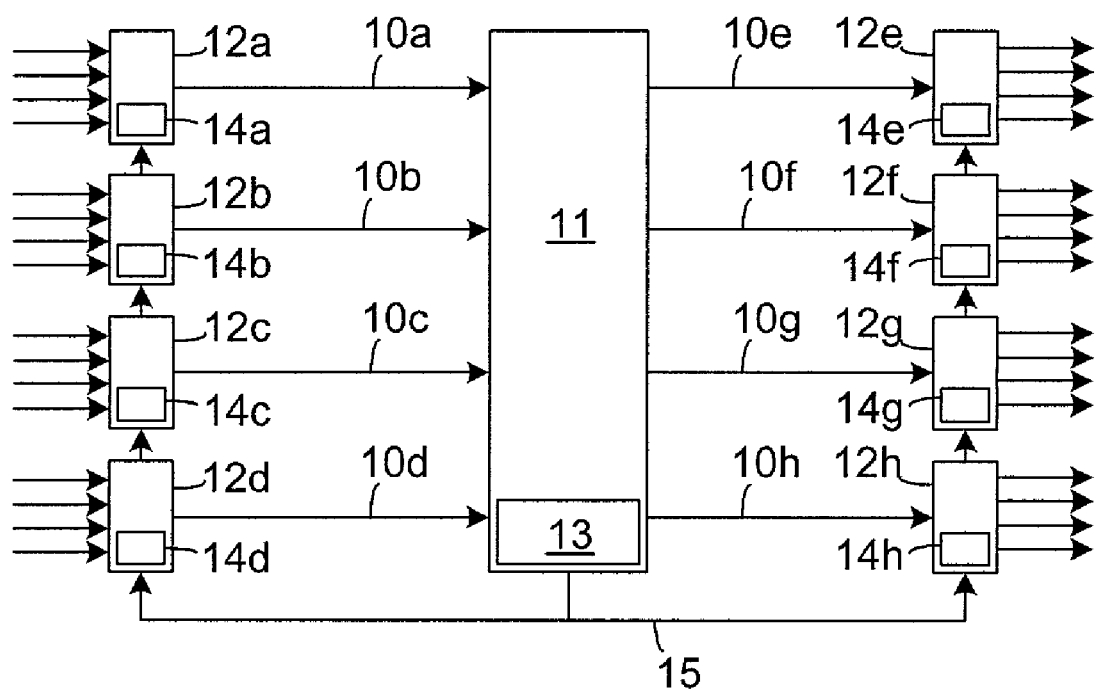
FIG. 1 is a functional block diagram illustrating the components of one embodiment of a system in which the present method can be implemented.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises a method and corresponding systems for dynamically computing a schedule which defines interconnections between ports in a switching system. In one embodiment, a switching core receives sufficiency reports from each of a plurality of ingress ports. If it is determined that the sufficiency reports indicate that the current schedule is inadequate to efficiently transmit data through the switching system, the switching core requests demand reports from the ingress ports. In response to this request, the ingress ports generate a series of suggested port connections, beginning with a first choice, then a second choice, and so on. The port connections are transmitted to the switching core, beginning with the first choice. The switching core receives the first choice for each of the ports and determines whether the aggregate schedule defined by the first choices is valid. If the aggregate schedule is valid, then this schedule is implemented. If the aggregate schedule is not valid, portions of it are discarded and the next choice from each of the ports is examined to identify connections to replace the discarded portions. This process is repeated until a schedule that is non-blocking and with a complete set of connections is obtained.

The present method may provide a number of advantages over conventional methods. Primarily, since the scheduling of data transfers can be dynamically adapted to the changing character of the incoming data traffic, the system may experience lower latency and greater performance than systems which employ conventional scheduling methods.

The present method is implemented in a multi-service, high-capacity core router/cross connect (referred to herein as a switching system). In one embodiment, the switching system uses an optical core matrix and a set of high-speed edge units. One of the advantages that may be provided by the present method is that it is scalable along with this type of switching system. To meet the blocking and delay requirements of complex router/cross connect networks, the method is designed to compute a schedule which defines connections within the switching system wherein there is no edge blocking, and minimal link blocking.

The traffic blocking of the switching system depends on two blocking components. The first blocking component is the blocking at the link level. In a non-blocking crossbar network, the link level blocking is eliminated because of the non-blocking nature of the matrix. In addition to the link level blocking, there is edge level blocking. The edge level blocking occurs when multiple ingress edges try to reach the same egress edge at the same time. In case of a loss system, this will cause the system blocking and the packets are lost.

The present method is designed to be implemented in a delay switching system wherein packets are waiting at the ingress queue for each port. As a result, packets will not be lost due to contention at this point. There may, however, be contention for connections between ingress ports and egress ports (i.e. edge level blocking). The present method is designed to allocate the core optical fabric resources so that this blocking will not cause significant impact on the delay and the performance of the system. The present method can help to reduce the edge blocking and consequently lead to less delay and jitter in the switching system.

Referring to FIG. 1, a functional block diagram illustrating the components of a system in which the present method can be implemented is shown. The switching system consists of four types of components: ports; ingress/egress edges; a switching core; and scheduling components. The components are kept synchronized during operation by a global timing mechanism. Switching core 11 is an optical switching core which is coupled to edge units 12 by optical fibers 10. Switching core 11 contains a scheduler 13 which is configured to control the scheduling of data traffic through the core according to the present method. Each of edge units 12 contains one or more ports. (In order to simplify the figure, the ports are not separately depicted.) Both edge units 12 and their ports contain scheduling components of their own. The edge unit scheduling components are indicated by reference numeral 14. The edge unit and port scheduling components are not designed to operate independently, but are designed to act in cooperation with core scheduler 13 to effectuate the scheduling of data traffic as determined in accordance with the present method. The scheduling components are coupled via interconnect 15 so that they can communicate scheduling information between them.

For the purposes of this disclosure, identical items in the figures may be indicated by identical reference numerals followed by a lowercase letter, e.g., 12a, 12b, and so on. The items may be collectively referred to herein simply by the reference numeral.

It should be noted that, while FIG. 1 depicts a system having 8 edge units and 32 ports (for both ingress and egress,) this figure is intended only to illustrate one type of switch in which the present method can be implemented. The method can be implemented in other types of switching systems, including switching systems having different numbers of edge units and/or ports, and switching systems which distribute scheduling functions in more or less scheduling components.

As indicated above, each edge has a number of associated ports. The bandwidth that can be supported by individual ports is limited. In a preferred embodiment, each port can transmit or receive 16 containers. Thus, if there are more than 16 containers that need to be transmitted from the various ingress ports to a single egress port, some of these will be blocked. In order to minimize the blocking that arises from the bandwidth limitations of the egress ports, it is necessary to schedule the transfers of the containers so that no more than 16 are transmitted to any one egress port in a single cycle. It is the responsibility of core scheduler 13 to determine a schedule for data transfers which enables the transfers to be completed with little or no blocking.

Figure 2:
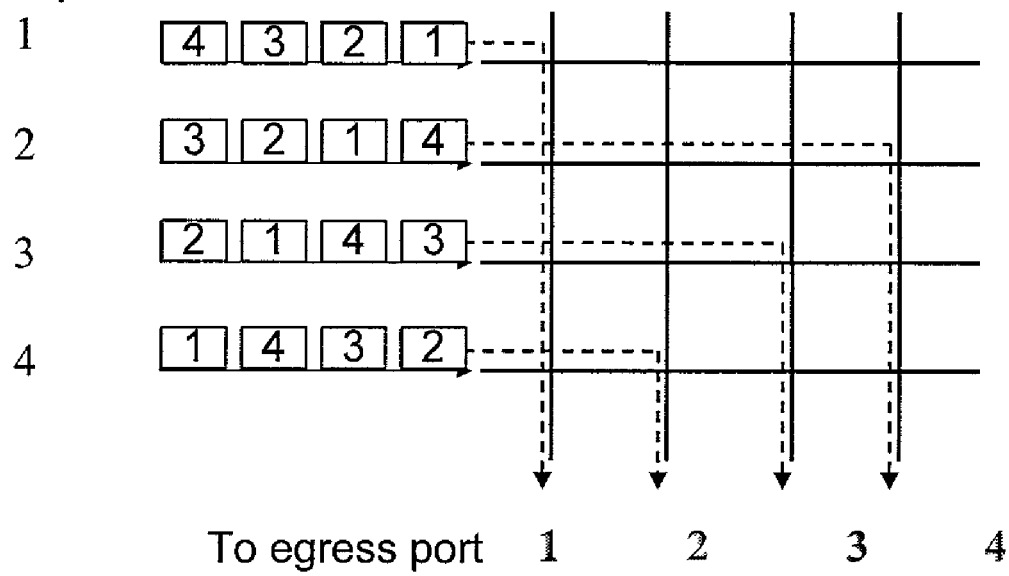
FIG. 2 is a diagram illustrating a schedule for non-blocking data transfers in a system such as the one depicted in FIG. 1.

Referring to FIG. 2, a diagram illustrating a schedule for non-blocking data transfers in a system such as the one depicted in FIG. 1 is shown. The blocks on the left side of the figure represent slots in which data can be transferred to one of the egress ports. The number inside each block indicates the destination egress port for that slot. Each row corresponds to a schedule for one of the ingress ports. (It should be noted that, for the sake of clarity, the ingress and egress ports are numbered from 1 to 4.) The horizontal lines in the figure represent the data lines which couple the respective ingress ports to the switching core, while the vertical lines in the figure represent the data lines which couple the respective egress ports to the core.

It can be seen from FIG. 2 that the data in successive time slots at ingress port 1 are transmitted to egress ports 1, 2, 3, and 4, in that order. The time slots corresponding to ingress port 2 are directed to egress ports 4, 1, 2 and 3. If the contemporaneous time slots for each of the ingress ports are examined, it can be seen that, at any given time, each egress port is only scheduled to receive data from one ingress port. For example, in the first time slot, ingress ports 1, 2, 3 and 4 are scheduled to transmit data to egress ports 1, 4, 3, and 2, respectively. Thus, at any given time, each of the data lines is only being used by a single ingress/egress port pair, and none of the data transfers will be blocked.

The scheduling of the connections between ports is complicated not only by the use of more ports in a typical switching system, but also by the fact that the data to be transferred is not necessarily homogeneously distributed among the ports. In other words, there may not be identical amounts of data at each ingress port which need to be transferred to identical destinations. The method which is used to schedule the transfers may therefore be very complex.

In a preferred embodiment, there are 16 ingress ports and 16 egress ports. (In the preferred embodiment, each physical port serves as both an ingress port and an egress port.) In this embodiment, there are 64 time slots in a frame (cycle). Each time slot can be used to transfer one container of data. Each of the 16 ingress ports in the preferred embodiment can transmit 16 containers per frame. Each egress port can receive only 16 containers.

It is desired to find a matrix of connections from port i to port j, such that every row and every column adds up to 16. In other words, every port transmits 16 containers and every port receives 16 containers. It is easy to put together a schedule where every ingress port transmits 16 containers, but it is more difficult to construct the schedule so that each egress port receives 16 containers.

Figure 3:
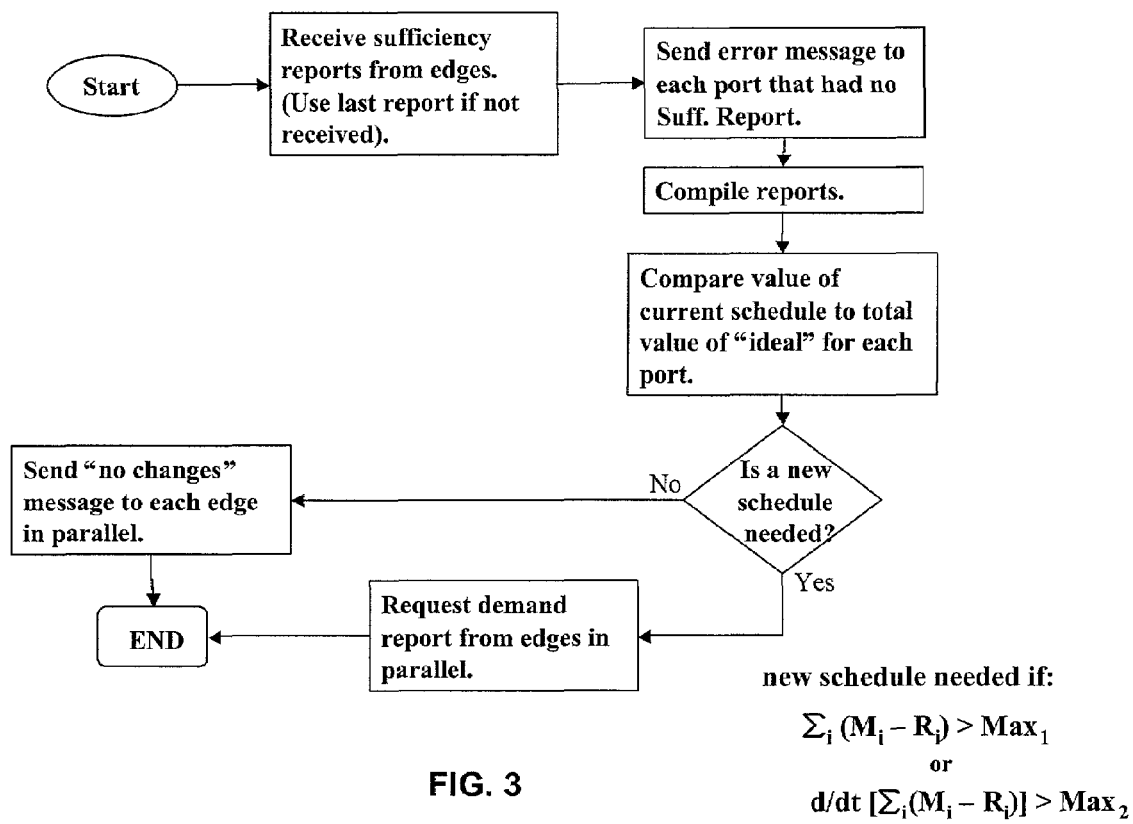
FIG. 3 is a flow diagram illustrating a method in accordance with one embodiment through which the scheduling system determines whether or not to generate a new schedule.

Referring to FIG. 3, the system determines whether or not a new schedule is needed based on information received from the ingress ports. Each ingress port creates a sufficiency report for every frame. Each edge collects the sufficiency reports from its own ingress ports. This function is performed by a scheduler associated with the edge (an "edge scheduler"). The collected reports are then forwarded to a scheduler associated with the switching core (the "core scheduler"). While it is possible for the edge scheduler to perform some manipulation or analysis of the data, in this particular embodiment, this function is performed by the core scheduler. The edge scheduler only serves to forward the sufficiency reports to the core scheduler.

The sufficiency report for each port will show the value of the best schedule the port could have, as well as the value of the current schedule. (The "value" can be a somewhat arbitrary measure of the performance of the port using the current schedule.)

In one embodiment, a port determines the 16 best connections it could have (based on the data it has to send). Then, it determines what it can send, based on the connections it currently has. The difference between the current and ideal schedules is quantified and used as an indicator of the sufficiency of the current schedule. The core scheduler uses the information received from all of the ingress ports to determine when a new schedule should be generated.

Because each port does not know the demands at the other ports, the best schedule for a particular port may not be the best schedule in terms of the overall performance of the system. The sufficiency report does, however, provide an indication of whether the overall schedule could be better. If enough of the ports indicate that their respective schedules are insufficient, then it can be assumed that the overall performance of the system (and the aggregate schedule) is also less than optimal. Thus, if enough of the ports indicate poor performance, the system will determine that a new schedule should be computed.

The core scheduler receives all of the sufficiency reports from the edges and computes a value which is a composite of the difference between the best schedules and current schedules of each of the ports. When the value computed by the core scheduler reaches a certain value, the core scheduler determines that a new schedule needs to be computed. Alternatively, the core scheduler may determine that the composite value is increasing more rapidly than a predetermined rate. Still another event which may cause the core scheduler to determine that a new schedule is necessary is the receipt of a specific connection request for TDM. In other words, if a customer buys a single link which is to be permanently established, a new schedule will be implemented to establish this link.

When the core scheduler determines that a new schedule needs to be computed, it transmits to each edge a request for demand reports from each of the ports on that edge. The edge forwards the request to each of the ports. Upon receiving the request, each port calculates its demand (i.e., where it needs to send its containers of data). The manner in which the demand is calculated will be described in more detail below. The demand is reported in the form of sets of connections which would be preferred for delivery of the containers at the port. Each port provides many of these sets of connections, starting with its first choice (best set of connections), then its second choice (next-best set of connections), and so on.

The demand reports are transmitted from the ports to their respective edges. Each edge compiles the reports and forwards the information to the core scheduler. The information is transmitted to the core scheduler in pieces. In the preferred embodiment, each piece contains one of the desired sets of connections (i.e., a desired schedule for each of the ingress ports for that edge. In other embodiments, more or less data could be contained in the each piece.

The schedule information is transmitted from the edges to the core scheduler in pieces because the amount of data is typically very large, and it may consequently take a long time to transmit all of the data. By transmitting the data in pieces, the core scheduler is able to operate on the portion of the data which has been received without having to wait for the remainder of the information.

Figure 4:
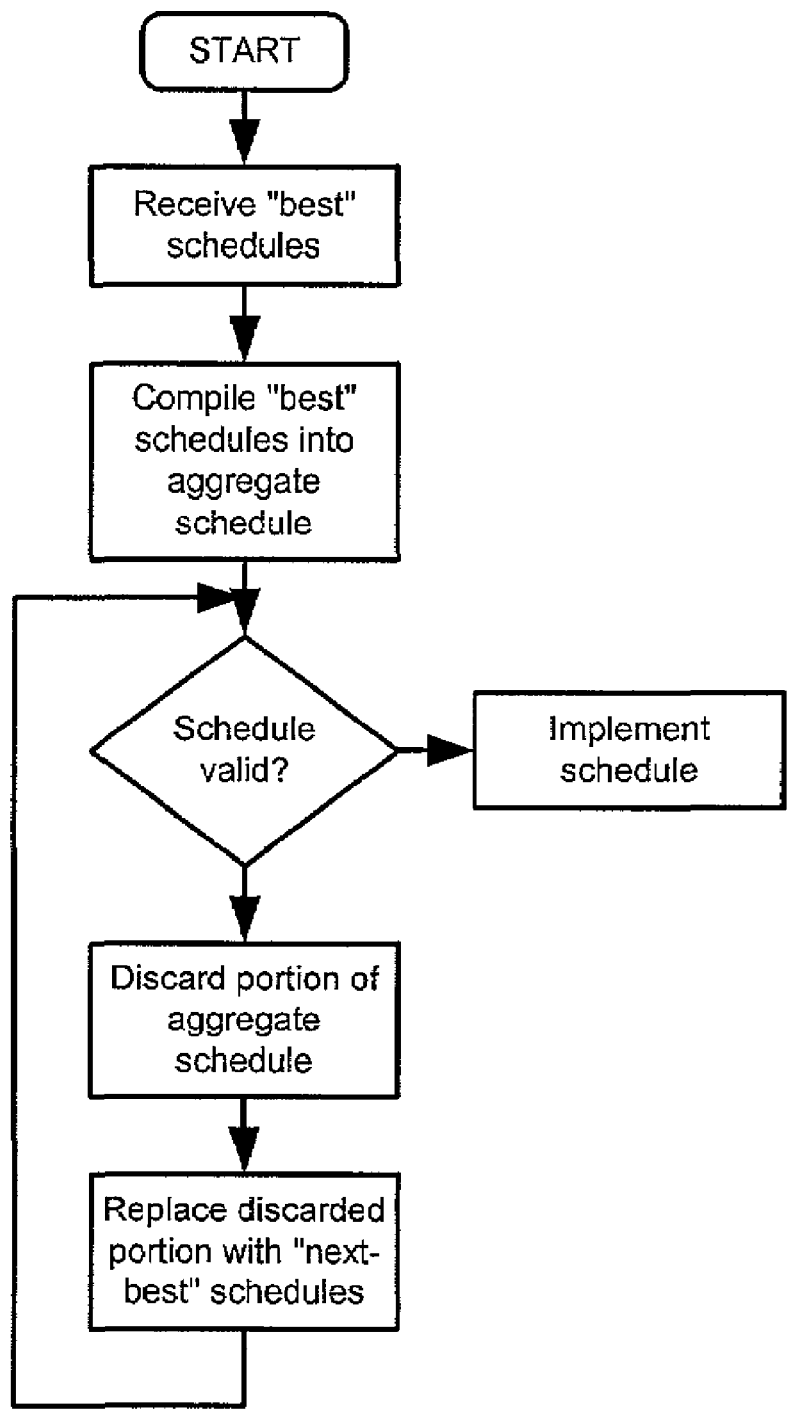
FIG. 4 is a flow diagram illustrating a method in accordance with one embodiment through which a system schedule is generated from a series of port schedules.

Referring to FIG. 4, when the core scheduler receives the first piece of information from each edge, it compiles the first choice of each port into a proposed system schedule (i.e., a schedule which defines connections for all of the ports. This schedule, however, may not be valid because each port computes its own preferred schedule, independent of the others. Consequently, the ports may, as a group, wish to send more containers to a single egress port than that port can handle. The core scheduler therefore has to validate the proposed schedule (i.e., verify that no more than the maximum number of containers is destined for a single egress port). In the preferred embodiment, each port can handle 16 containers, so if the proposed schedule has 17 or more containers scheduled to one egress port, it is invalid.

Typically, the first proposed schedule will have some ports which are destinations for less than 16 containers, and some ports which are destinations for more than 16 containers. The ports for which less than 16 containers are destined are within their capacity, but this is not optimal, because they could receive more containers. The ports for which more than 16 containers are destined, however, cannot handle all of these containers. This problem must be resolved, or some of the containers will be dropped.

The overloading of some of the egress ports is resolved by throwing out a portion of the proposed schedule. Specifically, some portion of the schedule which directs containers to the overloaded ports is discarded. This discarded portion will correspond to certain ones of the ingress ports. Alternative schedules for each of these ingress ports will be plugged into the system schedule in place of the discarded portion, and the system schedule will be re-validated.

After the portion of the schedule corresponding to the selected ports is discarded, each of the edges transmits the next piece of data to the core scheduler. As mentioned above, the next piece of data will include the next-best connections for each of the ingress ports. When the core scheduler receives this data, it will examine only the connections corresponding to ingress ports for which connections were previously eliminated from the system schedule. The remainder of the received data will be discarded because the previous connections for the other ingress ports were acceptable and were therefore retained in the system schedule. We also look at just those egress ports that we need to fill up. We take the best ones of the available ingress port connections to fill the egress ports up to capacity (16 containers in the preferred embodiment). In other words, after discarding connections corresponding to ingress ports which were previously retained in the system schedule, the best of the remaining connections are selected to fill up the egress ports.

After the first iteration, it is likely that there will still be some egress ports for which the system schedule exceeds their capacity, and some which are under-utilized. We therefore repeat the process with the next best set of port schedules until a schedule which the fills up each egress port exactly to capacity is found.

In the embodiment described above, an egress port is "frozen" when it reaches 16 containers (i.e., connections to that port are frozen). In another embodiment, the ports are not completely frozen when they reach 16 containers. The connections to the frozen ports may be changed in order to provide more flexibility in finding a set of port connections that fill up all of the egress ports. Additional flexibility can be obtained by not irretrievably discarding those port connections which are "discarded." If the connections may be used again in subsequent iterations, it may be easier to generate a system schedule that fills up all of the egress ports. While the processing requirements for this embodiment are greater than the embodiment described above, it is contemplated that it will generally result in a better schedule.

The above description pertains generally to generation of the system schedule. The description below pertains primarily to the generation of individual port schedules.

Data which arrives at one of the ingress ports is stored in a queue until there is a connection over which it can be transmitted to its destination port. If the current schedule already has enough containers on the connection that it can send this data to its destination, it can be sent right away. Otherwise, it remains in the queue until it can be sent.

When a the core scheduler determines that a new schedule is needed, it sends a request for demand reports to the ingress ports (via the edges). This request is asking for real data (i.e., what each port has to send). In one embodiment, the port measures its queues, starting with the highest priority, by total queue size, thus producing values of containers to be sent across the switch. The port then determines what are the best containers it could send.

A system schedule may stay in place for a relatively long time. For example, the schedule may be active for thousands of frames. If the highest priority queue has exactly 16 containers, but is not growing, it will nevertheless ask for all of the available bandwidth in order to transfer those containers. Since the amount of data in the queue is not growing, however, allocating all of the bandwidth to this queue would obviously be ineffective, since all of the containers would be transmitted in the first frame, and then there would be nothing left in the queue to transfer. Meanwhile, containers might be accumulating in the other queues. Since they were not allocated any bandwidth, however, none of these containers would be transferred. A statistical component is therefore added to the actual, current demand. In one embodiment, this component is an exponential weighted average. It is contemplated that this requires the least amount of data to be stored.

Thus, instead of using the size of the queues, divided by the number of containers as a measure of the port's demand, we use the size of the queue, divided by the number of containers, times the expected number of frames the schedule will be used. The 16 containers in the queue of the example above will therefore not ask for 16 connections, but instead for less than one connection. This will be added to the expected flow coming in. There can also be an adjustment for what the queue sizes are expected to be when the schedule goes into effect.

The demand for a port can be expressed as shown below.

$$W_{ijq} = F_{ijq} + (EQ_{ijq}/L)$$

where:

$W_{ijq}$ is the expected demand for a connection from i to j of quality of service q $F_{ijq}$ is the expected flow from i to j of quality of service q (measured in containers per cycle);

$Q_{ijq}$ is the length of the queue (measured in containers per cycle);

$P_e$ is the expected time to create a schedule (measured in cycles);

L is the expected lifetime of a schedule (measured in cycles);

$F_{ij}$ is the number of containers to be sent from i to j in the current schedule;

$X_{ijq}$ is the expected number of containers to be sent from i to j of quality of service q; and $EQ_{ijq}$ is the expected length of the queue at the start of the new schedule $$EQ_{ijq} = Q_{ijq} + P_e*F_{ijq} - P_e*X_{ijq}.$$

$W_{ijq}$ can be normalized so that, for any i, the sum of $W_{ijq}$ over all j is equal to the number of timeslots per frame available to a port (16 in the preferred embodiment).

In one embodiment, the method is implemented in a 40 Gbps switching system consisting of 4 edges and 1 core. Each edge has 4 OC-48 ports. In this embodiment, the actual physical port interface is OC-192 with only the equivalent of an OC-48 capacity activated for each port. In addition to TDM service, this embodiment will support four packet-based classes of services, MPLS, DfS-1, DfS-2 and BE.

The base model of the system for this embodiment is exemplified by the following characteristics.

1. OC-48 ingress port cards generating 16 flows, each at a bandwidth rate of STS-3.
2. Edges are connected to the Core using a 4-lambda DWDM link with 64 timeslots per frame, each carrying traffic for an equivalent bandwidth rate of STS-3. This represents an aggregate of 10 Gbps from each edge and a combined 40 Gbps to the core for the four edges.
3. A central dynamic scheduler determining the scheduling patterns and changing as a function of the changes in input traffic characteristics. The connectivity is subject to change each microsecond and the dynamic scheduler will produce a frame size of 64 microseconds, which will remain in effect until a new schedule is defined.
4. For each edge, the base model assumes that there are 64 wave slots per scheduling cycle, with each wave slot at 1 microsecond. Each wave slot will switch a 1250 byte container.

This system is composed of a core and one or more edges, where each edge has one or more port cards. In this embodiment, each edge and each port has both ingress and egress functionality (i.e. there are not separate ingress and egress edges). The switching system may support both time division multiplexed (TDM) traffic and packet traffic (Packet Over SONET—POS). A port card that supports packet traffic may support four different qualities of service: MPLS (Multi-Protocol Label Switching); Differentiated Services, or DiffServ 1 (DfS-1); DiffServ 2 (DfS-2); and Best Efforts (BE).

In this embodiment, an ingress edge has 4 ports, each of which is either a TDM card or a POS card. A POS packet traverses the framer and packet classifier, then waits in the input queue for servicing. A TDM packet traverses framer first, then goes directly to the staging buffer for servicing.

The dynamic scheduling algorithm provides the service order for different queues. When a packet arrives at the egress edge, it is distributed to a target port based on the appropriate dynamic schedule instance. Limited buffering is done at the egress ports to address the problem of jitter and packet fragmentation. The egress edge behaves as a dummy receiver from the core and as a transmitter to the external network devices.

The optical core creates a virtual fully-connected mesh between ports by periodically reconfiguring the core to allow exchange of data from one port (the ingress port) to another port (the egress port). The packet data from all ingress ports is synchronized with the switching cycle of the space switch fabric in the core. The schedule is coordinated and enforced throughout the switching system. Incoming data is switched to the appropriate egress ports without blocking or packet loss due to contention in the core. Thus the core is responsible for two tasks: switching and scheduling.

The function of the scheduler in the preferred embodiment is distributed in three separate levels: the core scheduler residing in the control cluster in the switching system core; the edge scheduler residing in the edge controller for each edge; and the port scheduler residing in each ingress port. For the preferred embodiment, the core scheduler is the entity primarily responsible for determining and distributing a non-blocking (i.e. non-edge-blocking) schedule for the entire system. Each system schedule will define a series of non-blocking fiber core connections between all ingress and egress ports. This series of connections is referred to as a frame. This frame will be repeated until a new schedule is adopted.

The preferred embodiment uses the heuristic scheduling algorithm described in detail above. This approach is designed to produce a dynamic schedule as frequently as is practicable which is sensitive to the various QoS (quality of service) classes for packetized data. At the same time, this scheduler will support the establishment and operation of TDM traffic streams that have extremely stringent latency requirements. When a new schedule needs to be established, it will be computed and distributed to the port schedulers through the intermediate edge schedulers. At the same time, the new schedule is distributed to the core fabric. After acknowledgement of receipt of the new schedule, and in sync with the periodic frame schedule, the entire system will instantaneously switch to the new schedule pattern.

Figure 5:
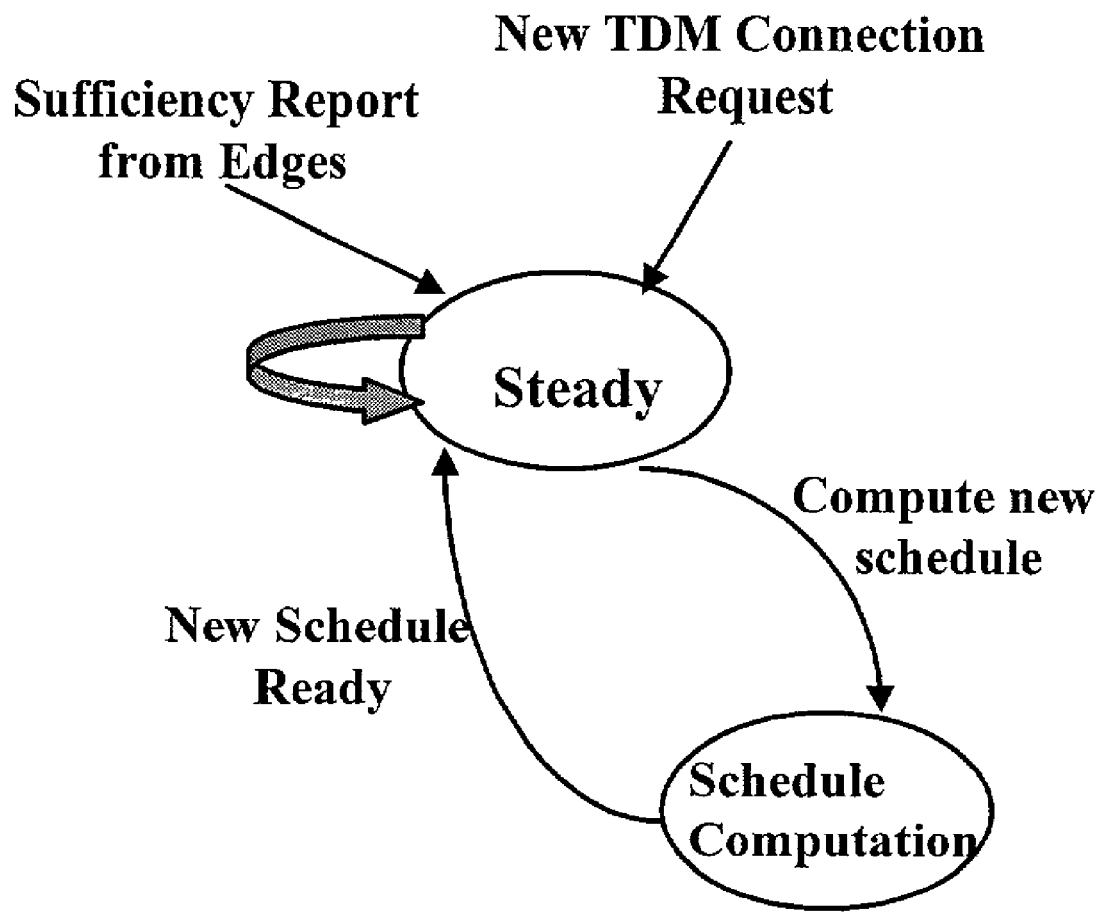
FIG. 5 is a state diagram illustrating the operation of a two state scheduler as implemented in a system employing the present method.

The dynamic scheduler in the preferred embodiment employs the two state scheduler operation as illustrated in the state diagram of FIG. 5. In a steady state, the switching system will repeatedly run a schedule pattern. The pattern will be repeated as long as the core scheduler determines that the performance of the schedule remains sufficient. The core scheduler determines sufficiency by evaluating the data in the sufficiency reports received from the edge schedulers. When the core scheduler determines that a new schedule is needed, it triggers a transition to the scheduling computation state. Transition to the scheduling computation state can also be triggered by a TDM connection request message coming from the core control complex.

The schedule change-over is triggered by a core scheduler synchronization signal. Special synchronization hardware synchronizes all the packet transfers from the different queues through the core optical matrix. This special synchronization hardware is triggered by a control message from the core scheduler.

All the schedule recommendations are sent from the core scheduler in the form of control messages to the edge schedulers and core optical controllers. At the right time, the synchronization hardware will transfer the schedule from the one memory plane to another. This transfer immediately activates the new schedule in the whole system and ensures the system integrity.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. For example, the components described above may be implemented in hardware, firmware or software, and the functions of the system may be redistributed among the components as desired in a given embodiment. It is contemplated that these variations, modifications, additions and improvements fall within the scope of the invention as detailed within the following claims.

The invention claimed is:

1. A method implemented in a switching system having a scheduler and a plurality of ports:
   (a) each of the plurality of ports receiving a demand request from the scheduler;
   (b) each of the plurality of ports calculating a series of port schedules, wherein each port schedule defines a set of port-to-port connections for transferring data from a corresponding one of the plurality of ports;
   (c) receiving a series of port schedules from each port;
   (d) upon receiving a first-choice port schedule from each port, determining whether an aggregation of the first-choice port schedules forms a valid system schedule;
   (e) if the aggregation forms a valid system schedule, implementing the aggregation;
   (f) if the aggregation does not form a valid system schedule, discarding at least a portion of the aggregation, receiving a next-choice port schedule from each port, replacing the discarded portion with corresponding portions of the next-choice schedules and determining whether the aggregation of the port schedules forms a valid system schedule; and
   (g) repeating (f) until the aggregation of the port schedules forms a valid system schedule.

2. A method for generating a system schedule for transferring data from a plurality of ingress ports to a plurality of egress ports in a switching system, the method comprising:
   (a) for each of the plurality of ingress ports, determining a preferred set of port-to-port connections for transferring data residing at the ingress port;
   (b) aggregating the preferred set of port-to-port connections for each port in a proposed system schedule; and
   (c) determining whether the proposed system schedule is valid
      if the proposed system schedule is valid, accepting the proposed system schedule, and if the proposed system schedule is invalid,
  discarding at least a portion of the proposed system schedule,
  identifying one or more of the ingress ports associated with the discarded portion of the proposed system schedule,
  replacing the discarded portion of the proposed system schedule with secondary sets of port-to-port connections, and
  repeating (c).

3. The method of claim 2 wherein the system schedule is generated dynamically while the switching system is operating to transfer data from the plurality of ingress ports to the plurality of egress ports.

4. The method of claim 2 wherein the preferred set of port-to-port connections for each port is determined by the respective port.

5. The method of claim 2 wherein the proposed system schedule is generated and validated by a core scheduler.

6. The method of claim 5 wherein determining the preferred set of port-to-port connections for each ingress port is performed in response to receiving a request from the core scheduler.

7. The method of claim 2 further comprising each of a plurality of edge units compiling the preferred sets of port-to-port connections for ports associated with the respective edge unit.

8. The method of claim 7 further comprising each of the plurality of edge units forwarding the compiled preferred sets of port-to-port connections to a core scheduler.

9. The method of claim 8 wherein the edge units are configured to forward the compiled preferred sets of port-to-port connections to the core scheduler in a plurality of pieces of data.

10. The method of claim 9 wherein each piece of data comprises a single set of port-to-port connections.

11. The method of claim 2 further comprising replacing a previous schedule in the switching system with the generated system schedule.

12. The method of claim 2 wherein determining a preferred set of port-to-port connections for each ingress port comprises calculating, for each egress port, the sum of: the expected flow of containers per frame from the ingress port to the egress port; and the expected number of containers in queue at the initiation of the proposed system schedule divided by the expected number of frames the proposed system schedule will be used.

13. A system for calculating a schedule for transferring data from a plurality of ingress ports to a plurality of egress ports in a switching system, the system comprising:
  a core scheduler; and
  a plurality of ingress ports;
  wherein each of the plurality of ingress ports configured to identify a plurality of sets of port-to-port connections for transferring data residing at the ingress port;
  wherein the core scheduler is configured to generate a proposed system schedule based on the sets of port-to-port connections identified by the ingress ports and to validate the proposed system schedule; and
  wherein if the proposed system schedule is valid, the core scheduler is configured to accept the proposed system schedule and wherein if the proposed system schedule is not valid, the core scheduler is configured to modify the proposed system schedule and to validate the modified proposed system schedule.

14. The system of claim 13 wherein the core scheduler is configured to maintain a current schedule while generating the proposed system schedule.

15. The system of claim 13 wherein the core scheduler is configured to repeat the modification and validation of the modified proposed system schedule until the modified proposed system schedule is valid.

16. The system of claim 13 wherein the core scheduler is configured to generate the proposed system schedule by aggregating the preferred set of port-to-port connections for each port to form the proposed system schedule.

17. The system of claim 13 wherein the core scheduler is configured to modify the proposed system schedule by discarding at least a portion of the proposed system schedule, identifying one or more of the ingress ports associated with the discarded portion of the proposed system schedule, and replacing the discarded portion of the proposed system schedule with secondary sets of port-to-port connections.

18. The system of claim 13 wherein each of the plurality of ingress ports configured to identify the plurality of sets of port-to-port connections in a preferred order, based on data transfer demands at the ingress port.

19. The system of claim 13 further comprising a plurality of edge schedulers, wherein each of the edge schedulers is configured to compile the sets of port-to-port connections for a plurality of associated ingress ports.

20. The system of claim 13 wherein the edge schedulers are configured to forward the compiled sets of port-to-port connections to the core scheduler.

21. The system of claim 13 wherein the edge schedulers are configured to forward the compiled sets of port-to-port connections to the core scheduler in a plurality of pieces of data.

22. The system of claim 13 wherein the edge schedulers are configured to forward the compiled sets of port-to-port connections to the core scheduler, one set at a time.

23. The system of claim 13 wherein the edge schedulers are configured to forward the compiled sets of port-to-port connections to the core scheduler in a preferred order.

24. The system of claim 13 wherein each of the ingress ports is configured to identify a preferred set of port-to-port connections by calculating, for each egress port, the sum of: the expected flow of containers per frame from the ingress port to the egress port; and the expected number of containers in queue at the initiation of the proposed system schedule divided by the expected number of frames the proposed system schedule will be used.

* * * * *